(12) United States Patent
Chen et al.

(10) Patent No.: US 8,052,282 B2
(45) Date of Patent: Nov. 8, 2011

(54) HEAT DISSIPATION SYSTEM AND ELECTRONIC DEVICE UTILIZING THE SAME

(75) Inventors: Chien-Fu Chen, Taipei Hsien (TW); Yi-Ping Hsieh, Taipei Hsien (TW); Chung-Chen Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 335 days.

(21) Appl. No.: 12/406,929

(22) Filed: Mar. 18, 2009

(65) Prior Publication Data

US 2010/0053896 A1    Mar. 4, 2010

(30) Foreign Application Priority Data

Sep. 1, 2008    (CN) .......................... 2008 1 0304335

(51) Int. Cl.
*G03B 21/16*    (2006.01)
(52) U.S. Cl. ................. 353/52; 353/53; 353/54; 353/55; 353/57; 353/58; 353/60; 353/61; 165/104.11; 165/104.33; 165/80.2; 165/80.5
(58) Field of Classification Search .............. 353/60–61, 353/119, 122, 52–58; 361/679.52, 688, 703, 361/709, 712; 362/264, 294, 218, 267, 373, 362/345, 431, 545, 547, 580, 646, 652, 311; 165/80.2, 80.5, 104.11, 104.21, 104.26, 104.33, 165/185; 438/69, 151, 675
See application file for complete search history.

(56) References Cited

U.S. PATENT DOCUMENTS

| | | | |
|---|---|---|---|
| 5,587,880 A * | 12/1996 | Phillips et al. | 361/679.47 |
| 6,400,568 B1 * | 6/2002 | Kim et al. | 361/697 |
| 6,735,081 B1 * | 5/2004 | Bishop et al. | 361/695 |
| 7,064,956 B2 * | 6/2006 | Patel | 361/697 |
| 7,600,908 B2 * | 10/2009 | Chang et al. | 362/623 |
| 7,841,721 B2 * | 11/2010 | Momose et al. | 353/54 |
| 7,854,517 B2 * | 12/2010 | Tsubura | 353/52 |
| 7,914,152 B2 * | 3/2011 | Li et al. | 353/54 |
| 2003/0155106 A1 * | 8/2003 | Malone et al. | 165/121 |
| 2003/0205363 A1 * | 11/2003 | Chu et al. | 165/80.3 |
| 2004/0207981 A1 * | 10/2004 | Gorenz et al. | 361/687 |
| 2006/0279706 A1 * | 12/2006 | Bash et al. | 353/54 |
| 2007/0291238 A1 | 12/2007 | Yanagisawa et al. | |

* cited by examiner

*Primary Examiner* — Georgia Y Epps
*Assistant Examiner* — Sultan Chowdhury
(74) *Attorney, Agent, or Firm* — Altis Law Group, Inc.

(57) ABSTRACT

An electronic device includes a heat dissipation system and an operating system. The heat dissipation system includes a housing, a first heat dissipation module received in the housing, heat pipes extending from the first heat dissipation module through the housing. The operating system includes a dust-proof housing, a heat source and a heat dissipation device. The heat source is received in the dust-proof housing and generates heat. The cooling module is adhered to an outer surface of the dust-proof housing to be cooled and attaches the heat pipes to the first heat dissipation module. The outer surface of the dust-proof housing is adjacent to the housing. The heat pipes transfer heat from the operating system into the first heat dissipation module.

12 Claims, 2 Drawing Sheets

HEAT DISSIPATION SYSTEM AND ELECTRONIC DEVICE UTILIZING THE SAME

BACKGROUND

1. Technical Field

The disclosure relates to heat dissipation, and specifically to a heat dissipation system and electronic device shielded from external contaminants.

2. Description of the Related Art

Many electronic devices require dissipation of heat generated by components thereof. Projectors, for example, often include a system dissipating heat generated by a high-power lamp. The heat dissipation system provides a fan establishing airflow to evacuate heat. However, when air flows into the projector, contaminants are also brought into the device, causing considerable nuisance and even damage thereto. Accordingly, mesh is often installed at the air inlet, restricting intake of the contaminants. However, such mesh and detritus collected thereon can greatly increase air resistance at the air inlet, such that the mesh requires regular cleaning. Such requirement is inconvenient and time consuming.

Therefore, it is desirable to provide a heat dissipation system which can overcome the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the electronic device and the heat dissipation system. Moreover, in the drawings, like reference numerals designate corresponding parts throughout the several views.

DETAILED DESCRIPTION OF THE EMBODIMENT

Embodiments of an electronic device and heat dissipation system are described in detail here with reference to the drawings. In the disclosure, the electronic device is a projector, although the disclosure is by no means limited thereto and other electronic devices requiring heat dissipation are equally well within the scope of the disclosure.

Figure 1:
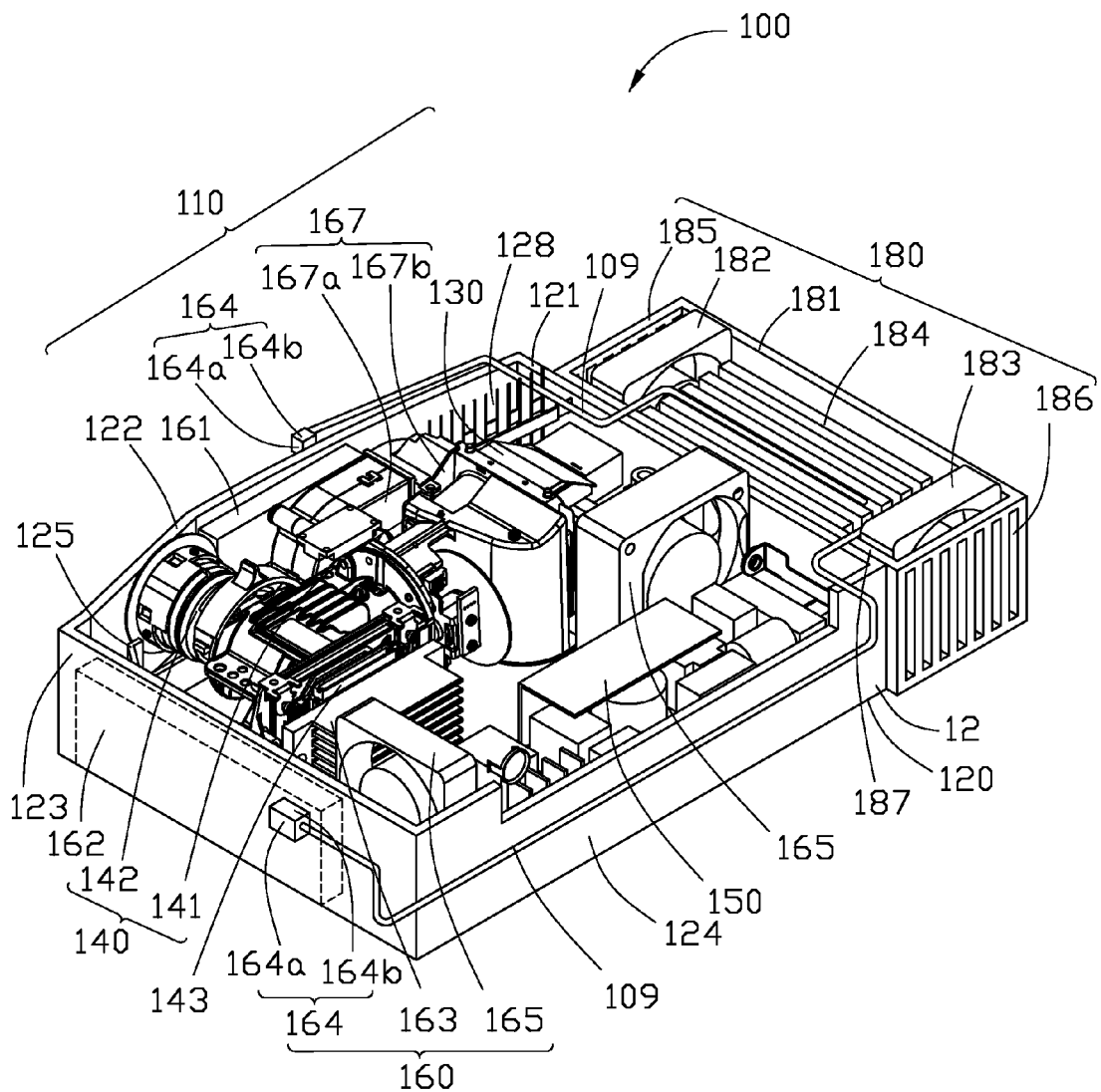
FIG. 1 is a view of a disclosed electronic device utilizing the heat dissipation system also disclosed.
Figure 2:
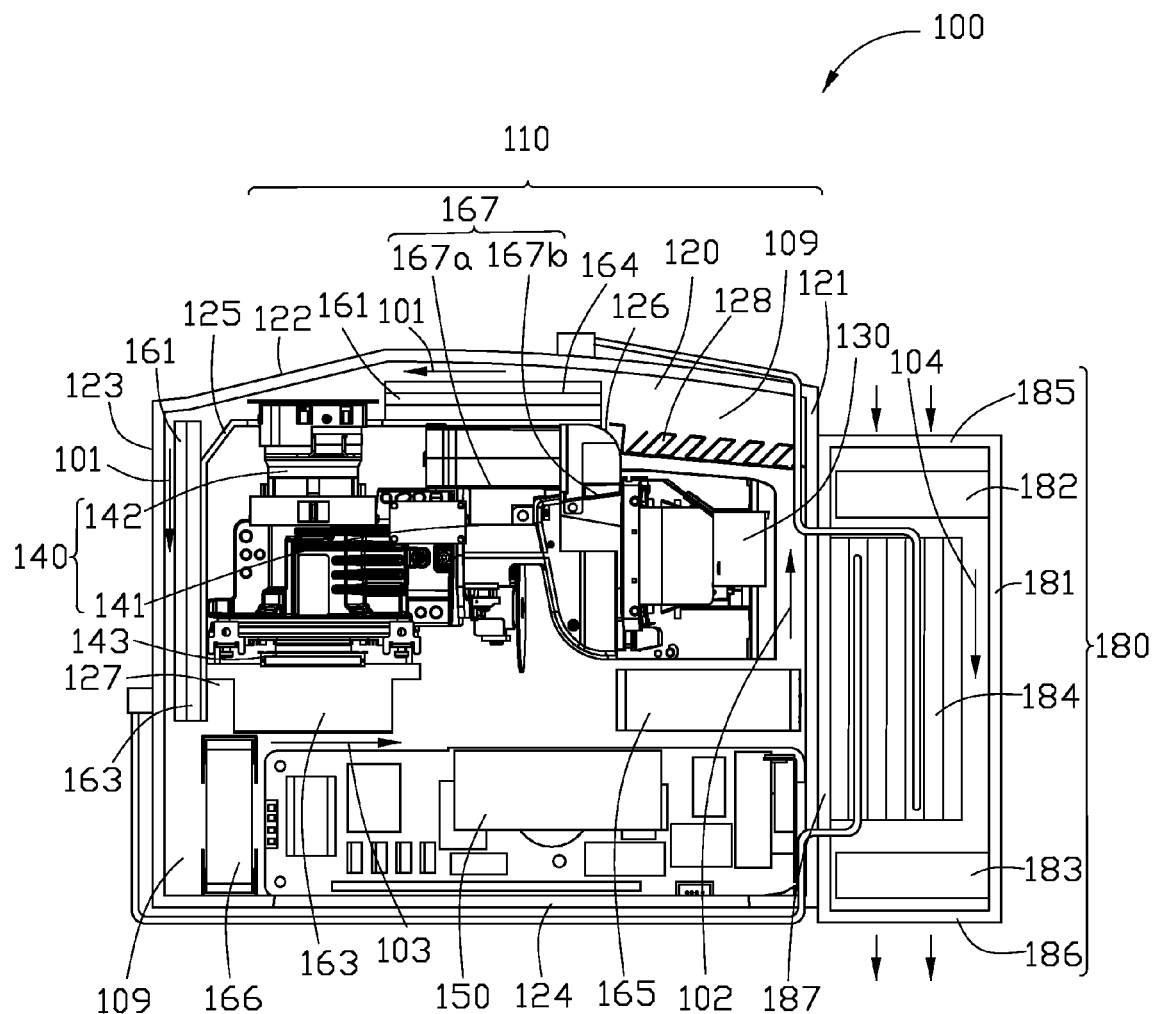
FIG. 2 is a plan view of the device utilizing the heat dissipation system of FIG. 1.

As shown in FIGS. 1 and 2, a projector 100 of a first embodiment includes a projection system 110 and a heat dissipation system 180. The projection system 110 includes a dust-proof housing 12, a light source 130, an optical engine 140, a printed circuit board (PCB) 150, and a heat dissipation device 160.

The dust-proof housing 12 houses the light source 130, the optical engine 140, the PCB 150, and the heat dissipation device 160, and includes a bottom wall 120, a first sidewall 121, a second sidewall 122, a third sidewall 123, a fourth sidewall 124, and an upper wall (not shown). The first sidewall 121, the second sidewall 122, the third sidewall 123, the fourth sidewall 124, the bottom wall 120, and the upper wall (not shown) are connected to form an enclosed space. An L-shaped blocking board 125 is disposed on the bottom wall 120 and positioned at the corner of the second sidewall 122 and the third sidewall 123. The L-shaped blocking board 125 has a first part 126 substantially parallel to the second sidewall 122 and a second part 127 substantially parallel to the third sidewall 123, thereby forming a first airflow channel 101 among the L-shaped blocking board 125, the second sidewall 122 and the third sidewall 123. A grating 128 connects the first side 126 and the first sidewall 121. The grating 128 is disposed on the bottom wall 120 and tilts away from the second sidewall 122.

The light source 130 is fixed to the bottom wall 120 and positioned at the corner of the first sidewall 121 and the grating 128, spaced from the first sidewall 121 to form a second airflow channel 102 (see FIG. 2).

The optical engine 140 is located adjacent to the second sidewall 122 and projects an image (not shown). The optical engine 140 includes a projection lens module 142, a digital micromirror device (DMD) 143, and an illuminator module 141 between the projection lens module 142 and the DMD 143. In operation, light emitted from the illuminator module 141 is concentrated and directed to the DMD 143. The DMD 143 modulates the light into images and reflects the images to the projection lens module 142 which enlarges and then projects the image.

The PCB 150 is secured on the bottom wall 120 and is adjacent to and parallel with the fourth sidewall 124. The PCB 150 is spaced from the optical engine 140 to form a third airflow channel 103 (see FIG. 2). The PCB 150 is electrically connected to and controls the optical engine 140.

The heat dissipation device 160 includes a first heat dissipation module 161, a second heat dissipation module 162, a third heat dissipation module 163, two cooling modules 164, a first fan 165, a second fan 166, a third fan 167, and a plurality of heat pipes 109. The third heat dissipation module 163 is attached to the DMD 143.

The first, second, and third airflow channels 101, 102, 103 communicate with each other.

The first heat dissipation module 161 is located between the L-shaped blocking board 125 and the second sidewall 122 along the first airflow channel 101. The second heat dissipation module 162 is positioned between the optical engine 140 and the third sidewall 123 along the first airflow channel 101.

The cooling modules 164 are attached to the second sidewall 122 adjoining the first heat dissipation module 161 and the third sidewall 123 adjoining the second heat dissipation module 162, respectively. The cooling modules 164 include cooling surfaces 164a facing the second, third sidewalls 122, 123, and heat transfer surfaces 164b opposite to the cooling surfaces 164a, and are connected to the plurality of heat pipes 109 and the heat dissipation system 180. Thus, heat transmitted through the first airflow channel 101 is rapidly transmitted to the cooling modules 164 and then transmitted through the heat pipe 109 into the heat dissipation system 180.

The first fan 165 is parallel to the PCB 150 and fixed between the PCB 150 and the light source 130. The second fan 166 adjoins the PCB 150 and is arranged at the corner of the third sidewall 123 and the fourth sidewall 124. The third fan 167 is located between the L-shaped blocking board 125 and the illuminator module 141 and includes a first air inlet 167a and a first air outlet 167b. The first air inlet 167a faces the fourth sidewall 124 and the first air outlet 167b faces the light source 130. The first, second and third fans 165, 166, 167 establish airflow through the first, second, and third airflow channels 101, 102, 103.

The heat dissipation system 180 attaches to the outer surface of the first sidewall 121 and includes a first housing 181, an exhaust fan 182, a blower 183, and a heat dissipation module 184. The first housing 181 includes a second air inlet 185 and a second air outlet 186. The exhaust fan 182, the blower 183 and the heat dissipation module 184 are received in the first housing 181. The heat dissipation module 184, such as a heat sink, is located between the exhaust fan 182 and the blower 183. The first air inlet 185 on the first housing 181 adjoins the exhaust fan 182 and is perpendicular to the first sidewall 121. The second air outlet 186 on the first housing 181 adjoins the blower 183 and is opposite to the second air inlet 185, thereby forming a fourth airflow channel 104. The first housing 181 includes a fifth sidewall 187 attached to the first sidewall 121.

In operation, the third fan 167 exhausts the heat of the light source 130 from the first air inlet 167a into the second airflow channel 102. The first fan 165 exhausts the heat of the second airflow channel 102 along the first airflow channel 101. The first heat dissipation module 161 dissipates the heat through one of the cooling modules 164 attached thereto into the heat pipes 109. The remaining heat is dissipated through the cooling module 164 attached to the second heat dissipation module 162 into the heat pipes 109 which serve as heat conductors.

It is noted that the projector 100 includes the projection system 110 with the heat dissipation device 160 and the independent heat dissipation system 180 attached to the projection system 110. The heat in the projector 100 is transmitted into the heat dissipation system 180 through the heat dissipation device 160, thereby avoiding airborne contaminants and enhancing heat dissipation efficiency.

While the disclosure has been described by way of example and in terms of preferred embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
    a heat dissipation system comprising:
        a housing;
        a heat dissipation module received in the housing; and
        heat pipes extending from the heat dissipation module through the housing; and
    an operating system comprising:
        a dust-proof housing;
        a heat source received in the dust-proof housing and capable of generating heat; and
        a cooling module adhered to an outer surface of the dust-proof housing to be cooled;
        wherein the heat pipes are attached to the cooling module and are capable of transferring heat from the operating system into the heat dissipation module, an airflow channel is defined in the dust-proof housing, the airflow channel surrounds the heat source and configured to allow air to circulate therein to dissipate heat inside the dust-proof housing to sidewalls of the dust-proof housing, the dust-proof housing is configured to prevent the air circulating in the airflow channel from exhausting from the airflow channel, the dust-proof housing is also configured to prevent exterior air from flowing into the airflow channel.

2. The electronic device of claim 1, wherein the dust-proof housing comprises a bottom wall, a first sidewall, a second sidewall, a third sidewall and a fourth sidewall, wherein the heat source is fixed to the bottom wall, and the first, second, third, and fourth sidewalls are perpendicular to the bottom wall and connect to form an enclosed space.

3. The electronic device of claim 1, the operation system further comprising a heat dissipation device adjacent to the heat source.

4. The electronic device of claim 1, wherein the cooling module comprises a cooling surface attached to the outer surface of the dust-proof housing, and a heat transfer surface opposite to the cooling surface; the heat transfer surface is connected to the heat pipes.

5. The electronic device of claim 1, the heat dissipation system further comprising a housing, an exhaust fan and a blower, the exhaust fan, the blower, and the heat dissipation module received in the housing, and the heat dissipation module between the exhaust fan and the blower.

6. The electronic device of claim 1, wherein the housing comprises an air inlet and an air outlet, the air inlet adjoining the exhaust fan and the air outlet adjoining the blower.

7. The electronic device of claim 1, wherein the heat dissipation module is a heat sink.

8. The electronic device of claim 1, wherein the heat source is a light source.

9. The electronic device of claim 8, wherein the electronic device is a projector, the projector comprising an optical engine.

10. The electronic device of claim 9, wherein the dust-proof housing comprises a bottom wall, a first sidewall, a second sidewall, a third sidewall and a fourth sidewall, the light source is fixed to the bottom wall, the first, second, third, and fourth sidewalls are perpendicular to the bottom wall and connect to each other, the optical engine is positioned at the corner of the second and third sidewalls, and the light source adjoins the optical engine and is located adjacent to the first sidewall.

11. The electronic device of claim 10, wherein the operation system comprises a heat dissipation device, the heat dissipation device adjoins the light source and is adjacent to the second sidewall.

12. An electronic device, comprising:
    a heat dissipation system, comprising:
        a housing;
        a heat dissipation module received in the housing; and
        heat pipes extending from the heat dissipation module through the housing and capable of attaching to a cooling module adhered to an outer surface of an object to be cooled, the outer surface of the object is adjacent to the housing, the heat pipes being capable of transferring heat from the object into the heat dissipation module; and
    wherein the object to be cooled is an operating system and the outer surface of the operating system comprises a dust-proof housing; the operating system further comprises a heat source received in the dust-proof housing and capable of generating heat, an airflow channel is defined in the dust-proof housing, the airflow channel surrounds the heat source and configured to allow air to circulate therein to dissipate heat inside the dust-proof housing to sidewalls of the dust-proof housing, the dust-proof housing is configured to prevent the air circulating in the airflow channel from exhausting from the airflow channel, the dust-proof housing is also configured to prevent exterior air from flowing into the airflow channel.

* * * * *